US009527967B2

(12) United States Patent
Iacobucci et al.

(10) Patent No.: US 9,527,967 B2
(45) Date of Patent: Dec. 27, 2016

(54) PEROXIDE MASTERBATCH BASED ON BIORESIN

(71) Applicant: Akzo Nobel Chemicals International B.V., Amersfoort (NL)

(72) Inventors: Paul Albert Iacobucci, St. Charles, IL (US); Wilhelm Klaas Frijlink, Zwolle (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/648,816

(22) PCT Filed: Dec. 2, 2013

(86) PCT No.: PCT/EP2013/075192
§ 371 (c)(1),
(2) Date: Jun. 1, 2015

(87) PCT Pub. No.: WO2014/086693
PCT Pub. Date: Jun. 12, 2014

(65) Prior Publication Data
US 2015/0329682 A1 Nov. 19, 2015

Related U.S. Application Data

(60) Provisional application No. 61/733,564, filed on Dec. 5, 2012.

(30) Foreign Application Priority Data

Jan. 3, 2013 (EP) .................................... 13150135

(51) Int. Cl.
| C08J 3/22 | (2006.01) |
| C08J 9/00 | (2006.01) |
| C08J 9/40 | (2006.01) |
| C08K 5/14 | (2006.01) |
| C08J 3/00 | (2006.01) |
| C08J 3/20 | (2006.01) |

(52) U.S. Cl.
CPC ......... *C08J 3/22* (2013.01); *C08J 3/005* (2013.01); *C08J 3/203* (2013.01); *C08J 3/226* (2013.01); *C08J 9/00* (2013.01); *C08J 9/40* (2013.01); *C08K 5/14* (2013.01); *C08J 2201/03* (2013.01); *C08J 2367/04* (2013.01); *C08J 2400/16* (2013.01); *C08J 2457/00* (2013.01); *C08J 2467/04* (2013.01); *C08J 2487/00* (2013.01)

(58) Field of Classification Search
None
See application file for complete search history.

(56) References Cited

U.S. PATENT DOCUMENTS

| 4,225,650 | A | 9/1980 | van Brederode et al. |
| 5,516,845 | A | 5/1996 | Heese et al. |
| 5,589,526 | A | 12/1996 | Sienel et al. |
| 5,698,617 | A * | 12/1997 | Marzola ............... C08F 255/02 523/201 |
| 5,808,110 | A * | 9/1998 | Torenbeek ........... C07D 323/00 549/352 |
| 6,358,435 | B1 | 3/2002 | Schuurman et al. |
| 7,429,420 | B2 | 9/2008 | Wiese et al. |
| 2003/0130436 | A1 | 7/2003 | Zucchelli |
| 2004/0142170 | A1 | 7/2004 | Prabhu et al. |
| 2006/0128907 | A1 | 6/2006 | Yu |
| 2006/0258796 | A1 | 11/2006 | Boogh et al. |
| 2007/0010608 | A1 | 1/2007 | Reynolds |
| 2007/0042183 | A1 | 2/2007 | Stenzel et al. |
| 2007/0232757 | A1 | 10/2007 | Cai et al. |
| 2015/0291761 | A1 | 10/2015 | Iacobucci et al. |

FOREIGN PATENT DOCUMENTS

| BR | 8804014 A | 4/1989 |
| CN | 101649028 A | 2/2010 |
| DE | 102 20 606 A1 | 11/2003 |
| EP | 0 423 639 A2 | 4/1991 |
| GB | 1 565 674 A | 4/1980 |
| GB | 2 441 181 A | 2/2008 |
| JP | S54-001386 A | 1/1979 |
| JP | S56-098247 A | 8/1981 |
| JP | S61-255948 A | 11/1986 |
| JP | 2003-138075 A | 5/2003 |
| JP | 2004-307538 A | 11/2004 |
| JP | 2005-105101 A | 4/2005 |
| JP | 2009-132914 A | 6/2009 |
| WO | 96/03397 A1 | 2/1996 |

(Continued)

OTHER PUBLICATIONS

Corneliussen, "Industry Patents," Plastics Engineering, Feb. 2009, p. 38-39.
Search Report of EP Application No. 13150135.5, dated Apr. 24, 2013.
International Search Report and the Written Opinion from the International Bureau of WIPO for International Application No. PCT/EP2013/075192, mailed Apr. 15, 2014.

(Continued)

*Primary Examiner* — Kara Boyle
(74) *Attorney, Agent, or Firm* — McDonnell Boehnen Hulbert & Berghoff LLP

(57) ABSTRACT

Masterbatch comprising one or more organic peroxides in liquid form, dispersed in a polymeric matrix comprising at least 50 wt % of a bioresin, wherein the polymeric matrix has a porosity, expressed as percentage of voids on the volume of the matrix, of 2.5-70 vol % and the concentration of water in the masterbatch is kept to 2000 ppm or less, based on the total weight of the masterbatch.

11 Claims, No Drawings

(56) References Cited

FOREIGN PATENT DOCUMENTS

| WO | 98/33770 A1 | 8/1998 |
| WO | 02/46273 A2 | 6/2002 |
| WO | 2004/052877 A1 | 6/2004 |
| WO | 2004/055083 A1 | 7/2004 |

OTHER PUBLICATIONS

ASTM D6866-05, "Standard Test Methods for Determining the Biobased Content of Natural Range Materials Using Radiocarbon and Isotope Ratio Mass Spectrometry Analysis," ASTM International, Apr. 2005.

ISO 15901-1, Evaluation of pore size distribution and porosimetry of solid materials by mercury porosimetry and gas adsorption—Part 1: Mercury porosimetry, Jan. 2006.

Chen, "Production control of polypropylene peroxide concentrated masterbatch," 2000, Abstract only.

Prevet, Perox PP: a range of peroxide masterbatch for PP controlled rheology, Polymers in Rheology Conference, Apr. 26-27, 2001, Abstract only.

\* cited by examiner

PEROXIDE MASTERBATCH BASED ON BIORESIN

This application is a national stage filing under 35 U.S.C. §371 of PCT/EP2013/075192, filed Dec. 2, 2013, which claims priority to U.S. Provisional Patent Application No. 61/733,564 filed Dec. 5, 2012, and European Patent Application No. 13150135.5, filed Jan. 3, 2013, the contents of which are each incorporated herein by reference in their entireties.

The present application relates to a masterbatch comprising one or more organic peroxides dispersed in a bioresin. It also relates to a process for the preparation of this masterbatch and to the use of this masterbatch for the modification of polymers.

Masterbatches are concentrates of additives, in this case organic peroxides, which can be used in processing polymers, particularly olefin polymers. Masterbatches can be used to add organic peroxides to the polymer to be processed in order to improve the dispersion of the peroxide in said polymer and improve the ease of dosing, especially when the user is incapable of handling organic peroxides in liquid form.

Masterbatches are generally obtained by dispersing high concentrations of the peroxides in materials that are compatible with the polymer to be processed. In order to obtain the best usage economy, the concentrates should contain usable amounts up to and including the highest possible quantity of peroxide while allowing an effective dispersion of the peroxide to be reached when said masterbatches are diluted in the polymer to be processed.

In view of the growing market for bioresins and the increasing number of bioresin applications, it would be desired to provide a masterbatch containing a peroxide dispersed in a bioresin. What is more, it would be desired to provide a masterbatch, which, when used to modify a bioresin, does not lead to unacceptable hydrolysis of said bioresin. This is important because several bioresins, for instance polylactic acid (PLA), are highly susceptible to hydrolysis during processing.

For instance, the residual moisture content of PLA prior to injection moulding should be not more than 100 ppm and prior to extrusion it should not be more than 250 ppm. Because PLA is very hygroscopic, leading to the uptake of a multiple of this amount in a few hours, the PLA has to be dried immediately prior to processing or packaged appropriately so that moisture uptake is not possible. Evidently, the subsequent addition of a masterbatch leading to a significant increase in water content is undesired. Therefore, it is important for the masterbatch to contain a relatively low water content.

The invention therefore relates to a masterbatch comprising one or more organic peroxides in liquid form, dispersed in a polymeric matrix comprising at least 50 wt % of a bioresin, wherein the polymeric matrix has a porosity, expressed as percentage of voids on the volume of the matrix, of 2.5-70 vol % and the concentration of water in the masterbatch is kept to 2000 ppm or less, based on the total weight of the masterbatch.

The peroxide(s) are present in the masterbatch in liquid form. This means that the peroxides should be liquid at room temperature or should be dissolved in a solvent which can be evaporated from the product.

Preferred are peroxides with a 1 hour half-life temperature of at least 77° C., measured in a 0.1 M monochlorobenzene solution using DSC-TAM.

Examples of such peroxides include di(3,5,5-trimethylhexanoyl) peroxide, 2,5-dimethyl-2,5-di(2-ethylhexanoylperoxy)hexane, 1,1,3,3-tetramehylbutyl peroxy-2-ethylhexanoate, t-amylperoxy-2-ethylhexanoate, t-butylperoxy-2-ethylhexanoate, t-butylperoxy diethylacetate, t-butylperoxy isobutyrate, 1,1-di(tert-butylperoxy)-3,3,5-trimethylcyclohexane, 1,1-di(t-amylperoxy)cyclohexane, 1,1-di(t-butylperoxy)cyclohexane, t-amylperoxy-2-ethylhexyl carbonate, t-amyl peroxyacetate, t-butylperoxyacetate, t-butyl peroxy-3,5,5-trimethylhexanoate, 2,2-di(t-butylperoxy)butane, t-butylperoxy isopropyl carbonate, t-butylperoxy-2-ethylhexyl carbonate, t-amyl peroxybenzoate, t-butyl peroxybenzoate, butyl 4,4-di(t-butylperoxy)valerate, 2,5-dimethyl-2,5-di(t-butylperoxy)hexane, t-butyl cumylperoxide, dicumyl peroxide, di(t-butylperoxyisopropyl)benzene, 2,5-dimethyl-2,5-di(t-butylperoxy)hexyne-3, di(t-butyl)peroxide, di(t-amyl)peroxide, isopropylcumyl hydroperoxide, 1,1,3,3-tetramethylbutyl hydroperoxide, 3,3,5,7,7-pentamethyl-1,2,4-trioxepane, cumyl hydroperoxide, t-butyl hydroperoxide, t-amyl hydroperoxide, and dimeric and trimeric cyclic ketone peroxides represented by the formulae I-II:

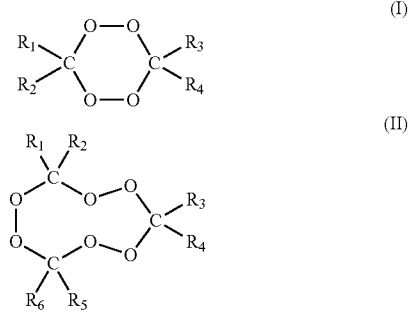

wherein $R^1$-$R^6$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; and each of $R^1$-$R^6$ may optionally be substituted with one or more groups selected from hydroxy, alkoxy, linear or branched alkyl, aryloxy, ester, carboxy, nitrile, and amido.

Most preferred peroxides are di(t-butyl)peroxide, di(t-amyl)peroxide, 2,5-dimethyl-2,5-di(t-butylperoxy)hexane, tert-butylperoxy-2-ethylhexyl carbonate, tert-amylperoxy-2-ethylhexyl carbonate, 3,3,5,7,7-pentamethyl-1,2,4-trioxepane, and 3,6,9-triethyl-3,6,9-trimethyl-1,4,7-triperoxonane.

The total concentration of peroxide in the polymeric matrix is preferably 50 wt % or less, based on the polymeric matrix, more preferably 3-45 wt %, and most preferably 4-40 wt %.

The polymeric matrix comprises at least 50 wt % of a bioresin. The term "bioresin" in this specification refers to polymer originating from renewable materials, i.e. materials, for example animal or vegetable, whose stock can be reconstituted over one short period on a human scale. It is necessary in particular that this stock can be renewed as quickly as it is consumed. In contrast to materials resulting from fossil sources, renewable materials contain $^{14}C$.

All the carbon samples drawn from living organisms (animal or vegetable) are in fact a mixture of 3 isotopes: $^{12}C$ (accounting for approximately 98.892%), $^{13}C$ (approximately 1.108%) and $^{14}C$ (traces: $1.2 \cdot 10^{-10}$%). The ratio $^{14}C/^{12}C$ of living tissue is identical to that of the atmosphere. In a living organism, the ratio $^{14}C/^{12}C$ is maintained constant by the metabolism, because carbon is continuously exchanged with the external environment. The average ratio of $^{14}C/^{12}C$ is equal to $1.2 \cdot 10^{-12}$.

$^{12}C$ is stable, i.e. the number of atoms of $^{12}C$ in a given sample is constant over time. $^{14}C$ is radioactive and the number of atoms of $^{14}C$ in a sample decreases over time with a half-life of 5730 years. Consequently, the presence of $^{14}C$ in a material, in whatever amount, indicates that the C-atoms making up that molecule come from renewable raw materials and not from ancient hydrocarbon sources.

Hence, a "bioresin" according to this specification contains $^{14}C$.

The $^{14}C/^{12}C$ ratio in a material can be determined by one of the methods described in standard ASTM D6866-05 (Standard Test Methods for Determining the Biobased Content of Natural Range Materials Using Radiocarbon and Isotope Ratio Mass Spectrometry Analysis, March 2005), preferably Method B described therein.

Examples of bioresins are polyolefins like polyethylene, polypropylene, ethylene vinyl acetate polymer and any mixtures thereof prepared from renewable resources.

A preferred polyolefin is polypropylene. The term polypropylene refers to polymers comprising at least 50 mole % of polypropylene units.

A preferred class of bioresins are biopolymers, i.e. polymers that occur in or are produced by a living organism or are produced from monomers or oligomers derived from plants and/or animals.

Examples of such polymers are polylactic acid (PLA), polyhydroxy alkanoates (PHAs) such as polyhydroxybutyrate (PHB), polyhydroxyvalerate (PHV), polyhydroxyhexanoate (PHH), polyhydroxybutyrate-co-hydroxyvalerate (PHBV), and polyhydroxybutyrate-co-hydroxyhexanoate (PHBH), and polybutylene succinates (PBSs) such as polybutylene succinate (PBS), and polybutylene succinate-co-adipate (PBSA).

The bioresin can be of a polymerization reactor grade or an extruded porous grade. The porosity of the polymeric matrix, expressed as percentage of voids, is 2.5-70 vol %, more preferably 5-65 vol %, and most preferably 10-60 vol %. This porosity is determined through mercury absorption according to ISO 15901-1 (2005). Such matrices are commercially available. If the porosity is too high, the peroxide may be squeezed out of the pores.

The concentration of water in the masterbatch is kept to less than or equal to 2000 ppm, preferably less than 1500 ppm and most preferably less than 1000 ppm, based on the total weight of the masterbatch. Water has a negative influence on several types of polymers and therefore the water content should be kept low. For instance, when the masterbatches are used in biopolymers, like polylactic acid, water will promote hydrolysis of the biopolymer during further processing, which is evidently undesired.

It is therefore desired to dry the polymeric matrix before incorporation of the peroxide to achieve a water content below the above-mentioned limit.

The resulting masterbatch should therefore also be packaged in such a way that the water content will not exceed 2000 ppm water over a storage period of at least 6 months. The water content is determined using Coulometric Karl Fischer titration as described in the Examples.

The masterbatch according to the present invention can be prepared by impregnation of the polymeric matrix with a liquid peroxide or a peroxide formulation. Such formulation may contain the peroxide in a solvent, in a total concentration of 10-60 wt %, more preferably 20-55 wt %, and most preferably 30-50 wt %.

Suitable solvents include linear and branched hydrocarbon solvents, such as isododecane, tetradecane, tridecane, Isopar® M, Exxsol® D80, Exxsol® D100, Exxsol® D100S, Soltrol® 145, Soltrol® 170, Varsol® 80, Varsol® 110, Shellsol® D100, Shellsol® D70, Halpasol® i 235/265, and mixtures thereof. Particularly preferred phlegmatizers are Isopar® M and Soltrol® 170.

Preferably, the solvent has a 95% boil-off point in the range of 200-260° C., more preferably 225-255° C., most preferably 235-250° C. The 95% boil-off point is the boiling point (bp) at which 95% by weight of the solvent is boiled off, or in the case of a single solvent compound, such as tetradecane, the boiling point of this compound. Typically the 95% boil-off point is obtained from conventional analytical methods like ASTM-D5399.

Impregnation can be done by contacting the liquid peroxide or the liquid peroxide-containing formulation with the polymeric matrix.

In order to reduce the risk of dust explosions and introduction of water in the system, the impregnation is preferably carried out under inert (e.g. nitrogen) atmosphere. The peroxide (formulation) is preferably slowly added to the polymeric matrix. After addition of the peroxide (formulation) to the matrix, the resulting mixture is preferably mixed for, e.g., 10-120 minutes, more preferably 20-90 minutes. Thereafter, solvent may be removed by evaporation, if so desired.

After impregnation, and either before or after solvent removal, the resulting masterbatch may be aged. This aging can be performed at any temperature below the SADT (self-accelerating decomposition temperature) of the peroxide and at any time in the range 2 hours to several days.

The polymeric matrix may be impregnated with only one liquid peroxide, but may also be impregnated with two or more peroxides.

The masterbatch according to the present invention may optionally contain certain additives as long as these additives do not have a significant negative effect on the safety, transportability and/or storage stability of the formulation. As examples of such additives may be mentioned: antiozonants, antioxidants, antidegradants, U.V. stabilizers, coagents, fungicides, antistatic agents, pigments, dyes, coupling agents, dispersing aids, blowing agents, lubricants, process oils, and mould-release agents. These additives may be employed in their usual amounts.

The present invention also relates to the use of such masterbatches in polymer modification processes such as the modification of polylactic acid to improve its melt strength by long chain branching.

The masterbatch is preferably added to said polymer in an amount of 0.01-1.5 wt %, more preferably 0.05-1.0 wt %, and most preferably 0.08-0.8 wt %, calculated as peroxide and based on the weight of the polymer.

The masterbatch according to the present invention is also suitable for compatibilizing biopolymer blends.

EXAMPLES

Example 1

Polylactic acid (PLA) with a porosity of 65% and a water content of 3,000 ppm was dried for 5 days in a climate box at a temperature of 50° C. and a relative humidity of 10%. The water content of the PLA after this drying procedure was analyzed to be 1,000 ppm, which was also confirmed by the measured weight loss of 2,000 ppm.

This water content was analyzed as follows. A sample of about 300 mg was weighed into a 5 ml vial and capped with a septum. The vial was heated to 120° C. for 5 min in a Metrohm 832 Thermoprep. The gas headspace was purged with dry nitrogen into a Karl Fischer solution (Hydranal Coulomat AG). The water content was determined by coulometric titration with a Metrohm 831 KF Coulometer. A blank determination using an empty sample vial was performed as reference.

The porosity of the PLA was determined by mercury intrusion according to ISO 15901-1: Evaluation of pore size distribution and porosimetry of solid materials by mercury porosimetry and gas adsorption—Part 1: Mercury porosimetry. The instrument used was a Micromeritics Autopore 9505 Porosimeter in the pressure range from vacuum up to 220 MPa. Prior to the measurement, the PLA was dried by vacuum at 35° C. for 6 hours.

A Nauta mixer was purged with dry air in order to maintain moisture-free conditions and was charged with the dried porous PLA. Subsequently, trimeric cyclic methyl ethyl ketone peroxide (17 wt % based on the total masterbatch) was added dropwise as a 41 wt % solution in isoparaffins (Trigonox® 301). After mixing for 1-2 hours, the slightly wetted material was transferred into a double aluminum bag (inner closed by tape, outer sealed). The material was allowed to mature for 5 days. This resulted in a masterbatch product with dry appearance and a water content of 500 ppm

Example 2

Example 1 was repeated, except that Trigonox®101 (2,5-dimethyl-2,5-di(t-butylperoxy)hexane was used as the peroxide and was loaded on the PLA in a concentration of 39 wt %.

The resulting masterbatch had a water content of below 1000 ppm.

Example 3

Polylactic acid (PLA) with a porosity of 65% and a water content of 3,000 ppm was dried by adding it to a Nauta mixer and purging it with a dry air flow during a certain period of time, with occasional mixing, until a water content below 1,000 ppm was obtained. The water content of the final dried PLA was 400 ppm.

The Nauta mixer was kept under dry air flow and 40 wt % Trigonox®117 (t-butylperoxy 2-ethylhexyl carbonate) was added using the same procedure as described for the addition of peroxide in Example 1.

The resulting masterbatch had a water content of below 1000 ppm.

Example 4

Caking cylinders (synthetic, with two half demountable walls, 5 cm internal diameter, and 7 cm height) were filled with the masterbatches of Examples 1, 2, and 3 (about 36 g). The masterbatches were covered with a lid and a load of 0.46 kg was placed on top of each to simulate the pressure conditions as if 25 kg product would be packed in a bag in a carton box with bottom surface of 38×28 cm.

The caking cylinders were stored in a climate chamber for 2 months at 25° C./50% RH. After this period the loads and cover lids were removed and the caking cylinders were opened carefully to visually inspect if caking had occurred. The masterbatches of Examples 1 and 2 showed no caking, whereas only slight caking was observed for the masterbatch of Example 3. With the slightest force applied the latter one was free flowing again.

The invention claimed is:

1. A masterbatch comprising one or more organic peroxides in liquid form, dispersed in a polymeric matrix comprising at least 50 wt % of a bioresin, wherein the polymeric matrix has a porosity, expressed as percentage of voids on the volume of the matrix, of 2.5-70 vol % and the concentration of water in the masterbatch is kept to 2000 ppm or less, based on the total weight of the masterbatch, wherein the bioresin is polylactic acid.

2. The masterbatch according to claim 1, wherein at least one of the one or more organic peroxides is an organic peroxide having a one hour half-life at a temperature of 77° C. or more.

3. The masterbatch according to claim 2, wherein at least one of the one or more organic peroxides is selected from the group consisting of t-butylperoxy 2-ethylhexyl carbonate, 2,5-dimethyl-2,5-di(tert-butylperoxy)hexane, and cyclic ketone peroxides having a structure according to any one of the following formulae:

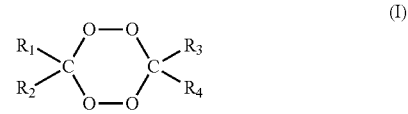

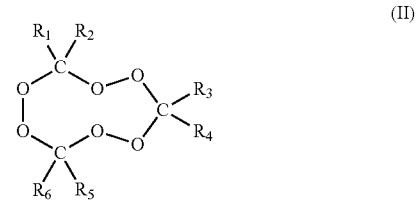

wherein $R^1$-$R^6$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; and each of $R^1$-$R^6$ may optionally be substituted with one or more groups selected from the group consisting of hydroxy, alkoxy, linear or branched alkyl, aryloxy, ester, carboxy, nitrile, and amido.

4. The masterbatch according to claim 3, wherein the cyclic ketone peroxide is 3,6,9-triethyl-3,6,9-trimethyl-1,4,7-triperoxonane.

5. The masterbatch according to claim 1, comprising 4-40 wt % of organic peroxide.

6. The masterbatch according to claim 1, wherein the polymeric matrix has a porosity of 10-65 vol %.

7. The masterbatch according to claim 1, further comprising a solvent.

8. A method for the modification of a polymer, comprising adding the masterbatch according to claim 1 to a polymer.

9. The method according to claim 8, wherein the modification is improving the melt strength of polylactic acid.

10. A process for the preparation of a masterbatch according to claim 1, comprising
(i) providing a polymeric matrix comprising at least 50 wt % of a bioresin and having a porosity, expressed as percentage of voids on the volume of the matrix, of 2.5-70 vol % and a water content of less than or equal to 2000 ppm and (ii) impregnating said polymeric matrix with one or more peroxides in liquid form, wherein the bioresin is polylactic acid.

11. The process according to claim 10, wherein the water content of the bioresin is less than or equal to 1000 ppm.

\* \* \* \* \*